Figure 1:
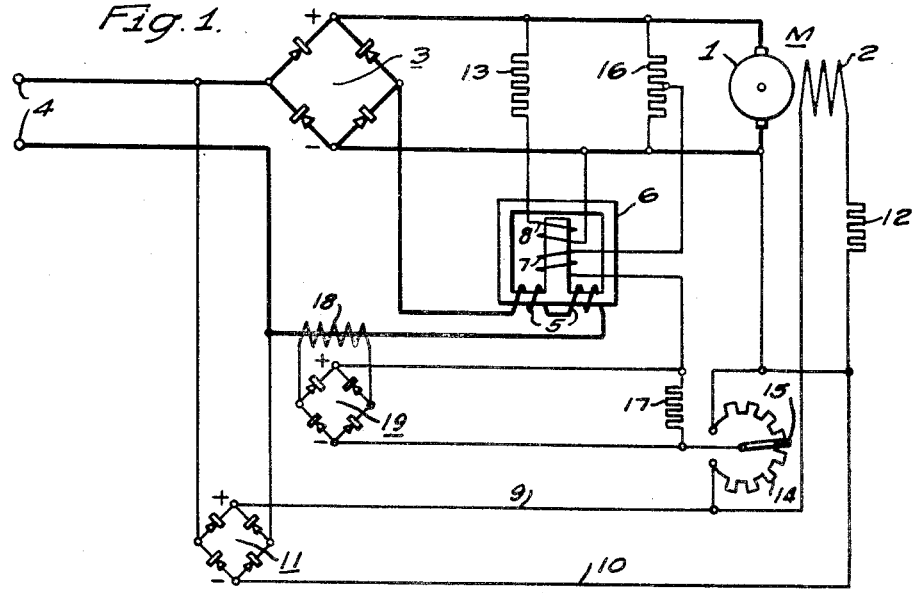

June 26, 1951 — L. W. HERCHENROEDER — 2,558,086

REACTOR CONTROLLED ADJUSTABLE SPEED DRIVE

Filed March 31, 1948

WITNESSES:

INVENTOR
Louis W. Herchenroeder.
BY
ATTORNEY

Patented June 26, 1951

2,558,086

UNITED STATES PATENT OFFICE 2,558,086

REACTOR-CONTROLLED ADJUSTABLE-SPEED DRIVE

Louis W. Herchenroeder, Pittsburgh, Pa., assignor to Westinghouse Electric Corporation, East Pittsburgh, Pa., a corporation of Pennsylvania Application March 31, 1948, Serial No. 18,130

3 Claims. (Cl. 318—347)

My invention is related to that of the copending application of G. E. King, Serial No. 18,207, filed March 31, 1948, and concerns control systems for adjusting and regulating the speed of a direct-current motor. More particularly, the invention relates to motor control systems which include a saturable reactor of controlled premagnetization as a regulating or amplifying element.

It is an object of my invention to provide a reactor-controlled drive of the above-mentioned kind which requires minimum winding space for the premagnetizing control windings of the reactor and permits obtaining optimum control efficiency of these windings.

Another object of the invention is to provide a system for energizing a direct-current motor from an alternating-current line by means of speed-controlling and regulating devices and circuits of utmost simplicity while securing a high accuracy and a wide range of speed control; and it is also an object to devise the system in such a manner that, aside from the motor to be controlled, only static apparatus, as contrasted with rotating machinery or vibratory regulators, are used for energizing, controlling and speed-regulating the drive.

According to one feature of the invention, the drive motor is energized through alternating-current to direct-current converting means which include a rectifier in series-connection with the alternating-current winding of a saturable reactance device so that the magnitude of the direct-current voltage applied to the motor depends upon the reactance of the reactor winding; and this reactance is controlled by a single premagnetizing direct-current coil of the reactor excited by the resultant effect of three component control voltages. The first component control voltage is supplied from direct-current supply means of adjustable voltage and determines the desired motor speed. The second component control voltage is derived from across the armature of the motor so as to vary in proportion to the motor terminal voltage; and this second component voltage is series opposed to the first component. The third component control voltage is provided by circuit means that are connected with the motor armature circuit or the associated alternating current energizing circuit so that the third component voltage varies in proportion to the armature current. Relative to the reactor control coil, the third component voltage is cumulative to the first component and normally of comparatively small magnitude so as to compensate for speed variations due to variations in motor current. In this manner, a single reactor control coil, preferably with an additional feed-back winding for increased amplification, suffices to secure an accurate and reliable maintenance of the selected motor speed regardless of load variations of the motor.

Figure 2:
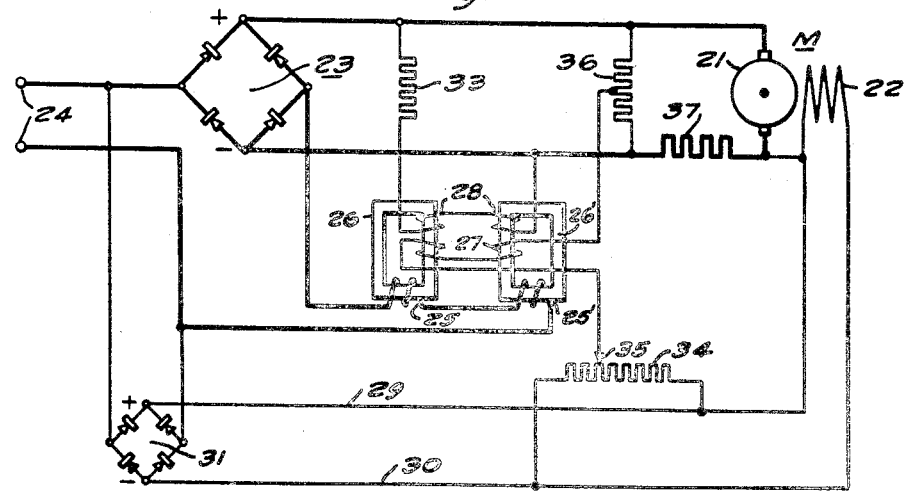

These and other objects of the invention will be apparent from the following description in conjunction with the drawing, in which:

Figures 1 and 2 represent schematically the circuit diagrams of two control systems according to the invention.

In the system shown in Fig. 1, the armature of the drive motor to be controlled is denoted by 1 and the appertaining field winding by 2. The armature circuit is energized from the output terminals of a full-wave rectifier 3. The individual elements of this rectifier may consist of junction type (dry) units or of electronic tubes. The alternating-current input terminals of rectifier 3 are connected across the alternating-current terminals 4 for connection to a suitable source of energy, such as an alternating-current line. Series connected with rectifier 3 between the terminals 4 is the main winding 5 of a saturable reactance device 6. This device is shown to have a three legged magnet core. Equal numbers of turns of winding 5 are associated with the respective outer legs of the reactor core so that substantially no flux is induced in the center leg by the alternating-current flowing through the winding 5. The center leg is equipped with a single control coil for direct current. The excitation of this coil determines the premagnetization of the reactor core and, therefore, the reactive impedance of the main winding 5. When control coil 7 is denergized, the premagnetization of the reactor is substantially zero so that the core is unsaturated and the reactance of winding 5 a maximum. The voltage then impressed across the input terminal of rectifier 3 is a minimum so that the motor receives minimum voltage and is either at rest or energized for minimum speed. A switch or contactor for disconnecting the motor from the rectifier or for interrupting the supply of alternating current to the rectifier 3 may be provided but is not illustrated in the drawing. When the excitation of control coil 7 is increased, the reactor core becomes increasingly premagnetized so that the reactance of winding 5 decreases, thereby increasing the voltage rectified by rectifier 3. The motor is then caused to operate at a correspondingly increased speed. The center leg of the reactor core is also equipped with a feedback coil 8 for increased amplification.

The motor field winding 2 receives constant excitation from direct-current buses 9 and 10 that are energized through a rectifier 11 from the alternating-current terminals 4. The motor field circuit may include a field resistor 12.

The feed-back coil 8 is connected with the output terminals of the rectifier 3, for instance, in parallel relation to these terminals so as to be excited in proportion to the variable output voltage of this rectifier. The connection preferably includes a calibrating resistor 13 in order to adjust the feed-back excitation of the reactor to the desired value. This excitation may be adjusted so that it provides a substantial portion or almost all of the premagnetization needed for maintaining the reactance of winding 5 at the proper value. The control coil 7 is then called upon to provide only the remaining premagnetizing excitation. As a result, a much lower excitation voltage on coil 7 is sufficient to control a proportionately very much larger output voltage of rectifier 3 than is the case without feed-back excitation.

The circuit of the control coil 7 includes three sources of component control voltage. The first source is represented by a speed control rheostat whose resistor 14 is connected across the constant voltage buses 9 and 10 and whose slide contact 15 taps a voltage from the resistor. The selected position of slider 15 determines the speed at which the motor M is supposed to run. The magnetic flux that coil 7 would cause if the voltage from resistor 14 were alone effective is in the same direction as the feed-back flux produced by winding 8.

The second source of component control voltage is represented by a tapped-off portion of a resistor 16 which is connected across the armature 1 of motor M. The second control voltage thus provided is proportional to the terminal voltage of the motor. The polarity of connection of the speed control rheostat relative to that of resistor 16 is such that the second component control voltage opposes the voltage tapped off from the rheostat.

The third source of component control voltage is represented by a resistor 17 which is series connected in the circuit of coil 7 and impressed by a variable voltage from a current transformer 18 through a rectifier 19. The transformer 18 is series connected in the alternating-current circuit of main winding 5 and rectifier 3. Consequently, the third component control voltage appearing across resistor 17 is substantially proportional to the current flowing through the rectifier 3 and, therefore, to the armature current of motor M. The polarity of the third component control voltage is such that this voltage is cumulative to the first component voltage taken from the speed control rheostat. The magnitude of the third control voltage is normally small compared with the first component voltage and is proportioned to correct the speed control for variations in load current. In other words, the third component control voltage serves to provide IR drop compensation.

When the motor is running at the proper speed determined by the setting of slider 15, the differential value of the second component control voltage indicative of the motor terminal voltage to the sum of the two other control voltages is such that the resultant excitation of control coil 7 has the value required for maintaining the reactance of main winding 5 at the proper magnitude. Any departure of the motor speed from the desired value causes the differential excitation of control coil 7 to 1. As a result, the reactance of winding 5 and the rectified voltage from rectifier 3 change accordingly in the direction and to the extent needed to restore the motor speed. The IR drop compensation provided by the voltage across resistor 17 takes care of modifying the above-mentioned ratio, so that the speed is not affected by changes in motor load.

In this manner a reliable control and speed regulation of high accuracy is secured despite the fact that the system is equipped only with static electric devices aside from the motor to be controlled. Since only one control coil is needed, the available winding space on the reactor is utilized to best advantage and the reactor can be kept smaller or be caused to operate at higher efficiency than is otherwise possible.

In the system according to Fig. 2, the motor armature 21 is energized from a rectifier 23 whose input terminals are connected across alternating-current terminals 24 in series with the main windings 25 and 25' of two respective reactors, each having an unbranched magnet core 26 or 26'. A control coil 27 is inductively coupled with both reactors and the reactors are shown to be also equipped with a feed-back coil 28. Excitation for the motor field winding 22 is provided by direct-current buses 29 and 30 energized by a rectifier 31 whose input terminals are attached across the alternating-current terminals 24.

The feed-back coil 28 is excited by voltage taken from across the output terminals of rectifier 23, and the connection may include a calibrating resistor 33.

The control coil 27 is excited in a circuit which includes the resistor 34 of a speed adjusting rheostat. Resistor 34 is connected across buses 29 and 30. The position of the appertaining slide contact 35 determines the desired speed of the motor. The circuit of control coil 27 extends further in series through a portion of a resistor 36 which is connected across the motor armature 21 in order to provide a second component control voltage proportional to the terminal voltage of the motor. A resistor 37 is series connected in the armature circuit of the motor and lies also in the circuit of control coil 27 in series relation to resistor 34 and in series with the tapped-off portion of resistor 36. The voltage drop imposed on resistor 37 by the armature current of the motor is a measure of the IR drop in the armature circuit. This voltage drop is the third component of the control voltage for the reactor control coil circuit. The relative polarities and magnitude ratio of the three component control voltages are similar to those of the component control voltages mentioned above with reference to the system of Fig. 1. Consequently, the system shown in Fig. 2 operates also to control and regulate the speed of motor M so as to maintain it at a desired value regardless of variations in motor load and in accordance with the selecting setting of the speed control rheostat.

It will be obvious to those skilled in the art upon studying the present disclosure that systems according to the mentioned can be modified in various respects without departing from the objects and essence of the invention and within the essential features of the invention as set forth in the claims annexed hereto.

I claim as my invention:

1. An adjustable-speed drive, comprising a direct-current motor having an armature circuit, energizing means connected with said armature circuit to provide adjustable energizing voltage therefor and including a rectifier with input terminals for alternating current and including a saturable reactance device having a reactance winding series connected with said input terminals, said reactance device having a control coil for controlling said voltage, a control circuit attached to said coil, direct-current supply means of substantially constant voltage having an adjustable speed-control rheostat series connected with said coil in said control circuit to impress thereon a first component control voltage of adjustable magnitude, a resistor attached across said armature circuit and series connected with said coil in said control circuit so as to impress on said coil circuit a second component voltage proportional to said energizing voltage, and circuit means responsive to current supplied through said energizing means to said armature circuit for providing a third component control voltage in accordance with said current, said latter circuit means being series-connected with said coil in said control circuit and poled to make said third component voltage cumulative with said first component voltage, said resistor being poled to make said second component voltage balanceable against said first and third component voltages.

2. An adjustable-speed drive, comprising a direct-current motor having an armature circuit, alternating-current terminals, a saturable reactor, a rectifier primarily connected in series with said reactor across said terminals and secondarily connected across said armature circuit to provide adjustable energizing voltage therefor, said reactor having a control coil for controlling said voltage, a control circuit attached to said coil, direct-current supply means of substantially constant voltage having an adjustable speed-control rheostat series-connected with said coil in said control circuit to impress thereon a first component control voltage of adjustable magnitude, a resistor attached across said armature circuit and series connected with said coil in said control circuit so as to impress on said control circuit a second component voltage proportional to said energizing voltage, and a resistor series connected in said armature circuit and series connected with said coil in said control circuit to impress on said control circuit a third component control voltage proportional to the current in said armature circuit and cumulative to said first component voltage, said second component voltage being balanceable against said first and third component voltages.

3. An adjustable-speed drive, comprising a direct-current motor having an armature, a rectifier having output terminals connected to said armature to provide energizing voltage therefor and having input terminals for alternating current, saturable reactor means having a main winding series connected with said input terminals, said reactor having a feed-back coil connected to said output terminals and having a control coil for controlling said voltage, direct-current supply means having an adjustable speed-control rheostat series-connected with said control coil for providing therefor a first component control voltage of adjustable magnitude, a resistor attached across said armature and series-connected with said coil in voltage-opposition to said rheostat to provide a second component control voltage dependent upon said energizing voltage, and current-responsive circuit means connected with said motor for providing a third component control voltage in accordance with the load current of said motor and series-connected with said coil in cumulative voltage relation to said rheostat.

LOUIS W. HERCHENROEDER.

REFERENCES CITED

The following references are of record in the file of this patent:

UNITED STATES PATENTS

| Number | Name | Date |
| --- | --- | --- |
| 1,426,123 | Stoekle | Aug. 15, 1922 |
| 2,066,919 | West | Jan. 5, 1937 |
| 2,082,496 | Howe | June 1, 1937 |
| 2,086,594 | Young | July 13, 1937 |
| 2,179,299 | Murcek | Nov. 7, 1939 |